United States Patent
Riefe et al.

(10) Patent No.: US 7,331,606 B2
(45) Date of Patent: Feb. 19, 2008

(54) KNEE BOLSTER

(75) Inventors: Richard K. Riefe, Saginaw, MI (US); Bruce M. Collier, Saginaw, MI (US); Minoo J. Shah, Farmington Hills, MI (US); Chantal S. Parenteau, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 342 days.

(21) Appl. No.: 10/965,537

(22) Filed: Oct. 14, 2004

(65) Prior Publication Data

US 2006/0082116 A1   Apr. 20, 2006

(51) Int. Cl.
B60R 21/045   (2006.01)

(52) U.S. Cl. ..................... 280/752; 280/751

(58) Field of Classification Search ............. 280/751, 280/752, 753; 296/187.05
See application file for complete search history.

(56) References Cited

U.S. PATENT DOCUMENTS

| | | | |
|---|---|---|---|
| 4,349,339 A | 9/1982 | Daniel | |
| 4,709,943 A * | 12/1987 | Yoshimura et al. | ......... 280/751 |
| 4,721,329 A | 1/1988 | Brantman et al. | |
| 4,732,409 A | 3/1988 | Colasanti | |
| 4,893,834 A | 1/1990 | Honda et al. | |
| 4,951,963 A | 8/1990 | Behr et al. | |
| 5,071,162 A | 12/1991 | Takagawa | |
| 5,312,133 A | 5/1994 | Pietila et al. | |
| 5,370,417 A | 12/1994 | Kelman et al. | |
| 5,413,379 A | 5/1995 | Koma | |
| 5,431,442 A * | 7/1995 | Tomita et al. | ............. 280/752 |
| 5,458,366 A | 10/1995 | Hock et al. | |
| 5,536,043 A | 7/1996 | Lang et al. | |
| 5,664,802 A | 9/1997 | Harris et al. | |
| 5,676,216 A | 10/1997 | Palma et al. | |
| 5,839,756 A | 11/1998 | Schenck et al. | |
| 5,865,468 A | 2/1999 | Hur | |
| 5,927,755 A | 7/1999 | Matsuo et al. | |
| 5,931,493 A | 8/1999 | Sutherland | |
| 5,931,520 A | 8/1999 | Seksaria et al. | |
| 6,032,978 A | 3/2000 | Spencer et al. | |
| 6,135,495 A | 10/2000 | Redgrave et al. | |
| 6,145,880 A | 11/2000 | White et al. | |
| 6,186,542 B1 | 2/2001 | Enders et al. | |
| 6,186,546 B1 | 2/2001 | Uhl | |
| 6,203,057 B1 | 3/2001 | Spencer et al. | |
| 6,213,497 B1 | 4/2001 | Spencer et al. | |
| 6,213,504 B1 | 4/2001 | Isano et al. | |

(Continued)

Primary Examiner—Eric Culbreth
(74) Attorney, Agent, or Firm—Michael D. Smith

(57) ABSTRACT

The invention provides an apparatus and method for absorbing energy in response to a vehicle crash. The apparatus includes a knee bolster disposable in a vehicle for absorbing an impact from at least one knee of a driver. The apparatus also includes a connecting device associated with the knee bolster. The connecting device includes a breakable portion for releasably connecting the knee bolster to the vehicle such that the knee bolster breaks away from the vehicle under predetermined conditions. The method according to the invention includes the step of disposing a knee bolster in a vehicle for absorbing an impact from at least one knee of a driver. The method also includes the step of releasably connecting the knee bolster to the vehicle such that the knee bolster breaks away from the vehicle under predetermined conditions with a connecting device associated with the knee bolster and having a breakable portion.

18 Claims, 4 Drawing Sheets

U.S. PATENT DOCUMENTS

| | | |
|---|---|---|
| 6,213,506 B1 | 4/2001 | Swann et al. |
| 6,270,112 B1 | 8/2001 | Bowers |
| 6,296,277 B1 | 10/2001 | Bittinger et al. |
| 6,305,710 B1 | 10/2001 | Bosgieter et al. |
| 6,329,724 B1 | 12/2001 | Shaklik et al. |
| 6,340,170 B1 | 1/2002 | Davis et al. |
| 6,431,600 B1 * | 8/2002 | Freisler et al. ............... 280/751 |
| 6,435,554 B1 | 8/2002 | Feldman |
| 6,464,255 B1 | 10/2002 | Preisler et al. |
| 6,474,687 B2 | 11/2002 | Cappabianca et al. |
| 6,491,322 B1 | 12/2002 | Ryner |
| 6,517,103 B1 | 2/2003 | Schneider |
| 6,609,727 B2 | 8/2003 | Figlioli et al. |
| 6,619,689 B2 | 9/2003 | Spencer et al. |
| 6,641,166 B2 | 11/2003 | Browne et al. |
| 6,688,643 B2 | 2/2004 | Schneider |
| 6,702,324 B2 | 3/2004 | Shimoyamada et al. |
| 6,837,518 B2 * | 1/2005 | Mullan ....................... 280/752 |
| 6,896,308 B2 * | 5/2005 | Okanda et al. ........... 296/37.12 |
| 6,948,738 B2 * | 9/2005 | Garnweidner et al. ....... 280/752 |
| 6,983,967 B2 * | 1/2006 | Scheidmantal et al. .... 296/1.09 |
| 2003/0173763 A1 * | 9/2003 | Yamazaki et al. .......... 280/748 |
| 2003/0184070 A1 * | 10/2003 | Vidal et al. ................. 280/752 |
| 2004/0124623 A1 * | 7/2004 | Yamazaki ................... 280/752 |
| 2005/0029791 A1 * | 2/2005 | Davis et al. ................ 280/752 |

* cited by examiner

KNEE BOLSTER

FIELD OF THE INVENTION

The invention relates to a knee bolster for absorbing an impact from at least one knee of a driver.

BACKGROUND OF THE INVENTION

Most automotive vehicles are equipped with one or more knee bolsters situated below the instrument panel in position to confront the knees of the driver and/or passenger of the vehicle in the event of a crash where the occupant is propelled forward by the momentum of the crash. Some knee bolsters are designed to be deformable on impact and may act to "pocket" the knee. While this is desirable in may respects, such known deformable knee bolster designs restrict lateral sliding movement of the knees once pocketed.

SUMMARY OF THE INVENTION AND ADVANTAGES

The invention provides an apparatus and method for absorbing energy in response to a vehicle crash. The apparatus includes a knee bolster disposable in a vehicle for absorbing an impact from at least one knee of a driver. The apparatus also includes a connecting device associated with the knee bolster. The connecting device includes a breakable portion for releasably connecting the knee bolster to the vehicle such that the knee bolster breaks away from the vehicle under predetermined conditions. The method according to the invention includes the step of disposing a knee bolster in a vehicle for absorbing an impact from at least one knee of a driver. The method also includes the step of releasably connecting the knee bolster to the vehicle such that the knee bolster breaks away from the vehicle under predetermined conditions with a connecting device associated with the knee bolster and having a breakable portion.

A knee bolster constructed according to the present invention is able to better accommodate transverse loads to the knee in a crash event. Should the transverse loads on the knee exceed a predetermined level in a crash event, the knee bolster is able to separate from the vehicle support structure under action of an applied shear force sufficient to break the releasable connection, enabling the knee bolster to slide transversely across the vehicle support structure. The separable, slideable knee bolster of the invention thus has the advantage of reducing transverse forces impacted to the knees under certain crash conditions, thereby reducing the chances of leg injuries.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
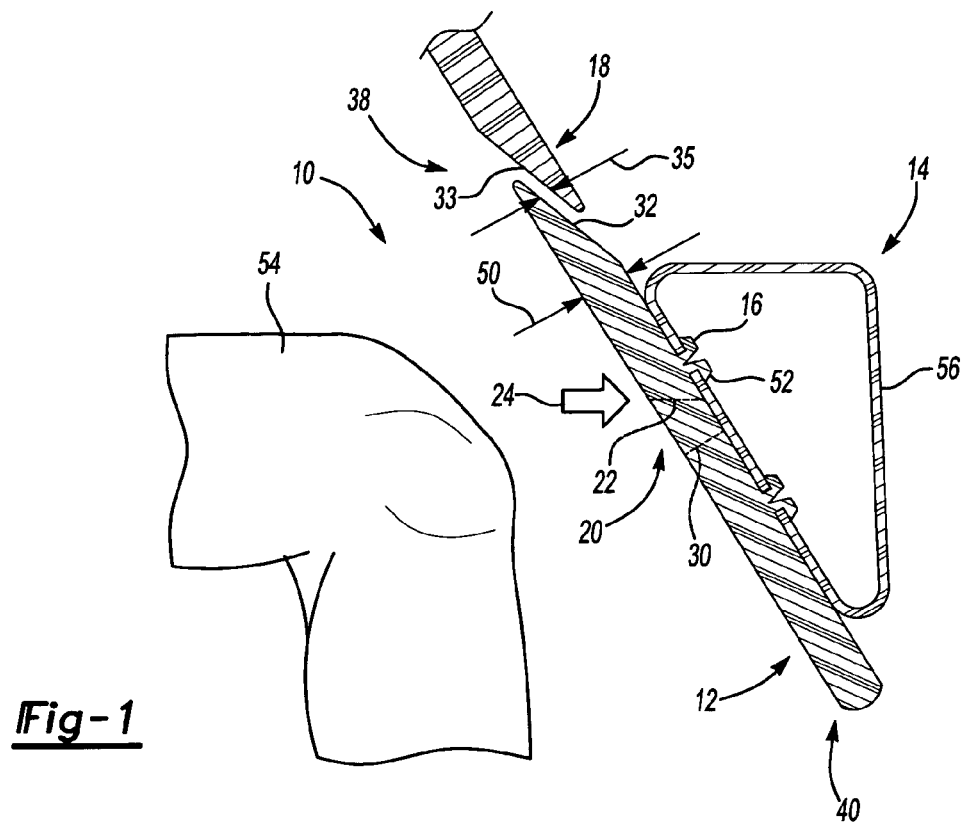
FIG. 1 is a first side view of a first exemplary embodiment of the invention.

A plurality of different embodiments of the invention is shown in the figures of the application. Similar features are shown in the various embodiments of the invention. Similar features have been numbered with a common two-digit reference numeral and have been differentiated by a third digit preceding the two common digits. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

The invention provides an apparatus and method for absorbing energy in response to a vehicle crash. Referring to a first embodiment of the invention shown in FIGS. 1-8, the apparatus 10 includes a knee bolster 12 disposable in a vehicle for absorbing an impact from at least one knee 54 of a driver. The apparatus 10 also includes a connecting device 14 associated with the knee bolster 12. The connecting device 14 includes a breakable portion 16 for releasably connecting the knee bolster 12 to the vehicle such that the knee bolster 12 breaks away from the vehicle under predetermined conditions.

The predetermined conditions occur when at least one of the driver's knees 54 impacts the knee bolster 12 in a way that imparts a transverse load or force to the knee bolster 12 exceeding a predetermined shear force of the connecting device 14. For example, in a crash event, there can be forward forces applied to the knee bolster 12 through engagement with the knees that impacts a forward compressive load to the knee bolster 12 as well as transverse upward forces that may impact an upward shear force to the knee bolster 12, or lateral forces that may impact a lateral side-ways shear force to the knee bolster 12. The knee bolster 12 constructed according to the present invention enables the knee bolster 12 to selectively release from the vehicle support structure to which it is initially attached in the event the applied shear forces exceed a predetermined shear strength of the breakable portion 16 of the connecting device 14 reduce the transverse loads borne by the legs.

Figure 2:
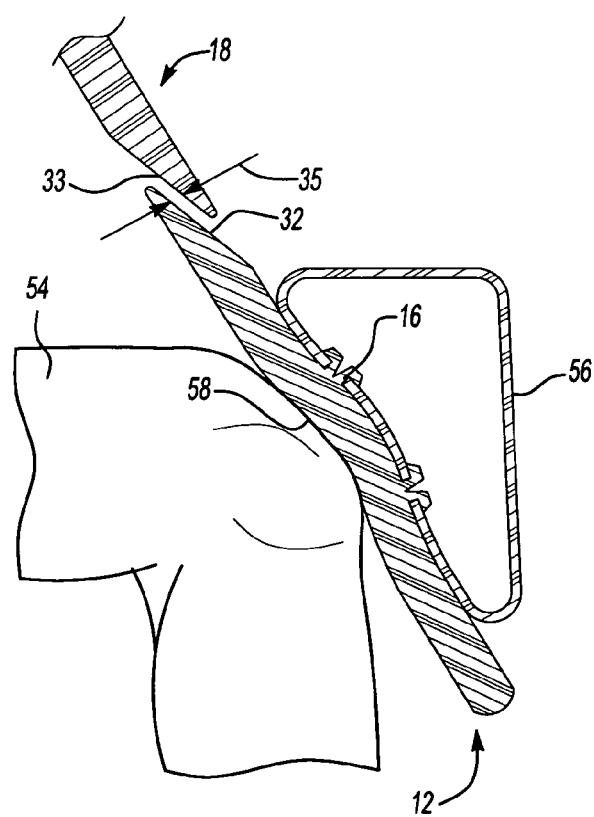
FIG. 2 is a second side view of the first exemplary embodiment of the invention wherein a driver's knee has impacted a knee bolster.

The breakable portion 16 is positioned to be broken in response to forces, such as force 26, acting transverse to the knee bolster 12. For example, the knee bolster 12 defines an impact area 20 and a first striking axis 22 aligned with said impact area 20. The knee bolster 12 can be positioned in the vehicle such that the impact area 20 faces the knees of the driver. Furthermore, the knee bolster 12 can be positioned in the vehicle such that the first striking axis 22 is aligned with an expected path of movement of the driver's knee 54. In other words, the knee bolster 12 can be positioned in the vehicle such that, generally, the breakable portion 16 remains intact in response to a force acting on the impact area 20 and aligned with the first striking axis 22. Furthermore, the knee bolster 12 can be positioned in the vehicle such that, generally, the breakable portion 16 is remains intact in response to a force acting parallel with the first striking axis 22. The force 24 shown in FIG. 1 is aligned with the first striking axis 22 and the knee bolster 12. The knee 54 strikes the knee bolster 12 "head-on" and forms a pocket 58 as a result of the knee bolster 12 deforming under the applied forwardly directed force. The formation of pocket 58 serves to dissipate some of the kinetic energy of the impact and captures the knee within the knee bolster 12. A strictly forwardly applied load is shown in FIG. 2, where the pocket 58 is formed and the breakable connectors 16 are not subjected to shear forces sufficient to break the connection between the bolster 12 and a mounting bracket 56.

The mounting bracket 56 is fixedly associated with the vehicle. The mounting bracket 56 is shown as a generally triangular metal bracket in the exemplary embodiments of the invention. However, the mounting bracket 56 can be any shape as desired. The mounting bracket 56 maintains the position of the knee bolster 12 during normal vehicle operations. The cooperation between the mounting bracket 56 and the apparatus 10 defines the position of the impact area 20 and the angle between the axis 22 and 30. In the exemplary embodiments of the invention, the plane defined by the impact area 20 is generally thirty degrees from vertical. However, in alternative embodiments of the invention, the plane defined by the impact area 20 could be greater than thirty degrees from vertical, less than thirty degrees from vertical, or vertical.

Figure 3:
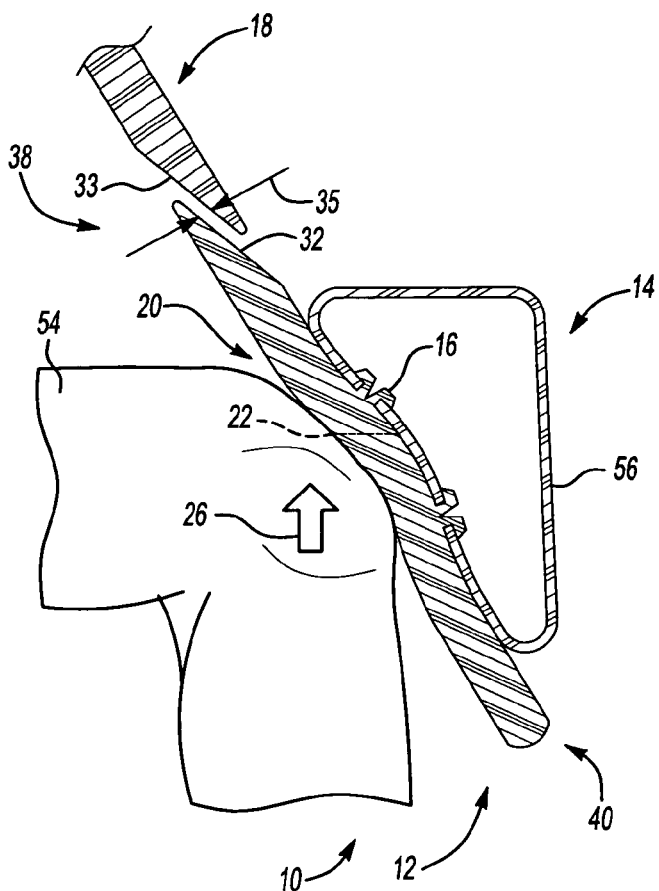
FIG. 3 is a third side view of the first exemplary embodiment of the invention wherein the driver's knee has impacted the knee bolster and is applying a substantially vertical force against the knee bolster.
Figure 4:
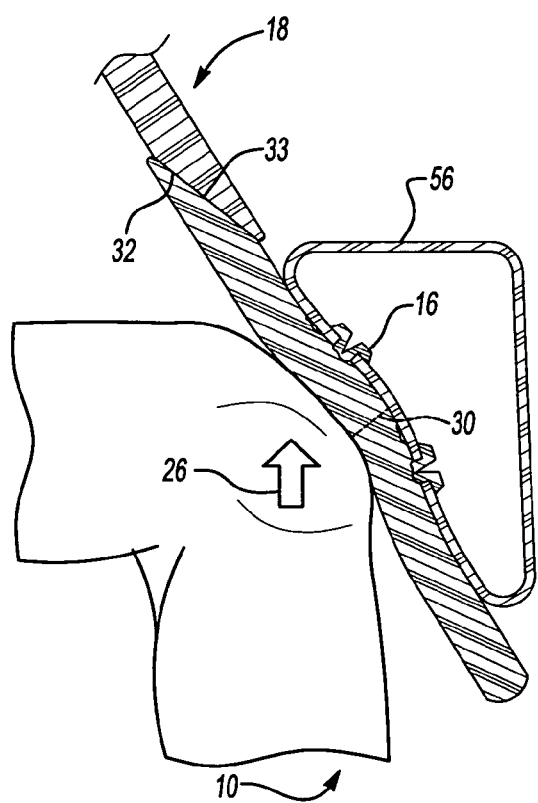
FIG. 4 is a fourth side view of the first exemplary embodiment of the invention wherein the driver's knee has impacted the knee bolster and is applying a substantially vertical force against the knee bolster, and wherein a connecting device has broken to release the knee bolster with respect to the vehicle.
Figure 5:
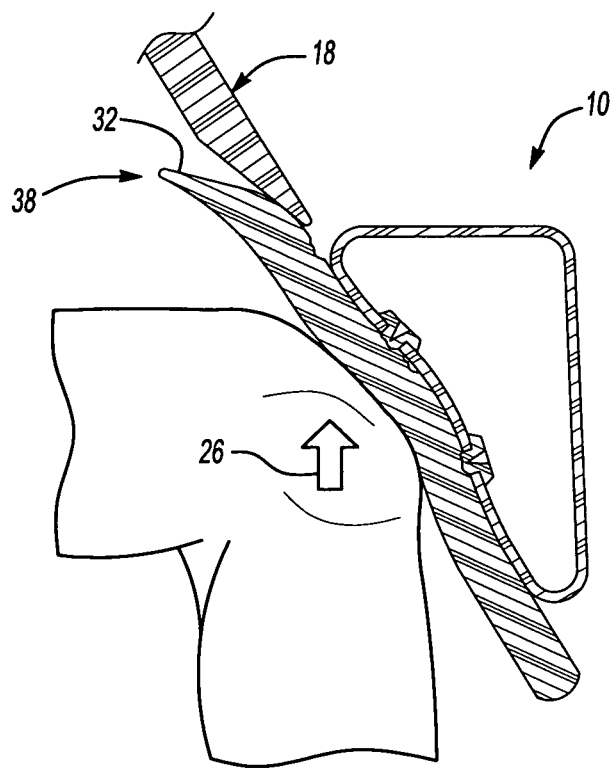
FIG. 5 is a fifth side view of the first exemplary embodiment of the invention wherein the driver's knee has impacted the knee bolster and is applying a substantially vertical force against the knee bolster, and wherein the connecting device has broken to release the knee bolster with respect to the vehicle and wherein the knee bolster has moved vertically with respect to the position shown in FIG. 4.

FIGS. 3 and 5 illustrates a crash condition in which, in addition to the expected forward compression loads that deform the bolster 12 and form the pocket 58, there is an upward shear force component 26 of the load which has a tendency to drive the knee bolster upwardly. The breakable connectors 16 are responsive to application of side shear loads 26, and, if the forces exceed the designed in fracture strength of the breakable connectors 16, the connectors 16 will break or shear, as illustrated in FIG. 4 allowing the bolster 12 to slide relative the mounting bracket 56.

In the preferred embodiment of the invention, the bolster 12 has peripheral edges or regions 32 that overlap adjacent peripheral edges 33 of the instrument panel 18. The overlap conceals a designs in clearance gap 35 that exists between the bolster 12 and instrument panel 18 so that the occupants of the vehicle do not perceive a gap between the instrument panel 18 and the knee bolster 12. The overlapping peripheral regions 32, 33 are preferably designed so as not to significantly inhibit the sliding movement of the bolster 12 across the mounting bracket 56 once it is separated. As illustrated in FIGS. 1-5, the peripheral regions 32 of the bolster 12 preferably overly peripheral regions 33 of the instrument panel 18, and the overlapping surfaces are preferable angled or ramped to cause the peripheral region 32 of the bolster 12 to first engage the peripheral region 33 of the instrument panel 18, as shown in FIG. 4, and then to ramp up and over the instrument panel 18, as shown in FIG. 5 as necessary to accommodate the range of sliding movement impacted to the bolster 12 as a result of the applied transverse shear force 26.

Figure 6:
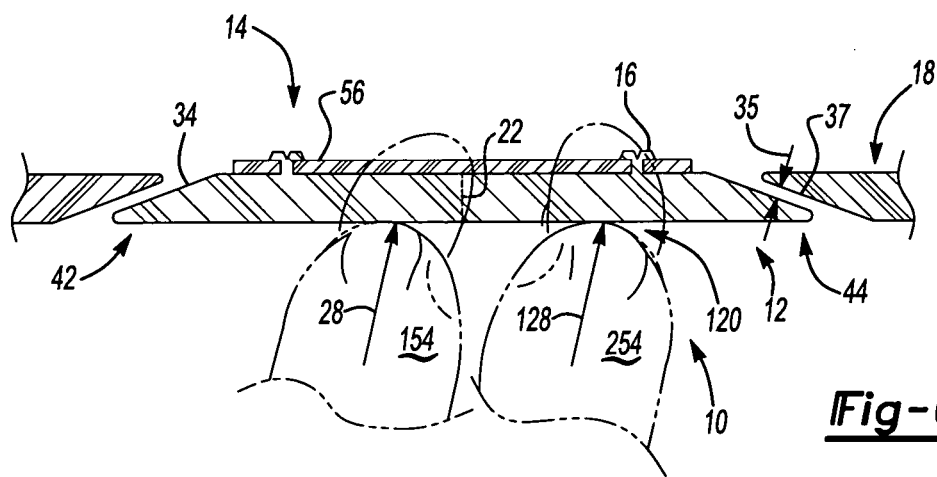
FIG. 6 is a first top view of the first exemplary embodiment of the invention wherein the driver's knees have impacted the knee bolster and is applying an angled force against the knee bolster.
Figure 7:
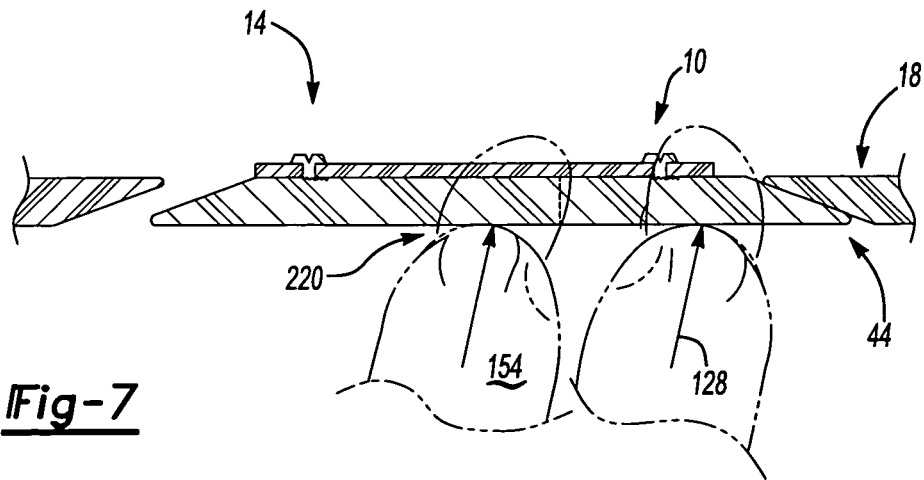
FIG. 7 is a second top view of the first exemplary embodiment of the invention wherein the driver's knees have impacted the knee bolster and is applying an angled force against the knee bolster and wherein connecting device has been broken.
Figure 8:
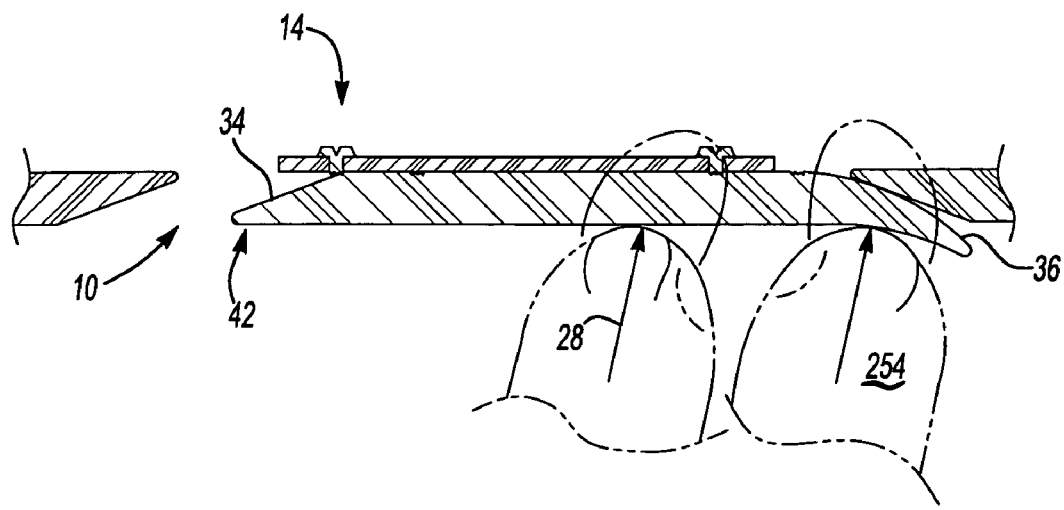
FIG. 8 is a third top view of the first exemplary embodiment of the invention wherein the driver's knees have impacted the knee bolster and is applying an angled force against the knee bolster and wherein connecting device has been broken and wherein the knee bolster has moved horizontally with respect to the position shown in FIG. 7.

FIGS. 6-8 illustrate another crash condition in which a transverse slide load 26 has been applied to the bolster 12 (in addition to the forward load) as a result of the knees 154, 254 striking the bolster 12 at a sideways angle. The lateral sideways component of the force vector tends to urge the bolster 12 sideways in the direction of the applied side load shear force. If the shear force 26 exceeds the designed break-away force of the connectors 16, the connectors 16 will be caused to break in the same manner as described above in connection with FIGS. 1-5, and will enable the bolster 12 to slide relative to the mounting bracket 56, as illustrated in FIG. 7, in the direction of the shear force 26. The sides of the bolster 12 may have similar peripheral regions 34, 36 that overlap adjacent peripheral regions 37 of the instrument panel 18 to conceal the gap 35, and these surfaces preferably ramp cross one another as shown in FIGS. 7 and 8 as earlier described with respect to the upward sliding movement of FIG. 1-5 so as to not substantially impair the range of sideways sliding movement and the bolster 12.

In the first exemplary embodiment of the invention, the breakable portion 16 is a plastic bolt that engages the mounting bracket 56 in a snap-fit relationship. For example, the breakable portion 16 defines at least one tab 52. The breakable portion 16 is moved through an aperture defined by the mounting bracket 56 and the tab 52 locks the breakable portion with respect to mounting bracket 56. The mounting bracket 56 can be fixedly associated with the vehicle. The tab 52 separates from the part of the breakable portion 16 disposed adjacent to the knee bolster 12. After separation, the knee bolster 12 slides relative to the tab 52.

The breakable portion 16 can be defined by any breakable connecting structure. In the exemplary embodiment of the invention, the breakable portion 16 is a shearable member. However, in alternative embodiments of the invention, the breakable portion 16 could be a friction disc, adhesive, or any combination of a shearable member and a friction disc and adhesive.

The knee bolster 12 can be aligned with an instrument panel 18 of a vehicle for sliding movement. For example, the knee bolster 12 includes a longitudinal axis 30 extending normal to the impact area 20, a top side 38, a bottom side 40, a left side 42 and a right side 44. The knee bolster 12 can also include at least one peripheral surfaces 32, 34, 36 extending transverse to said longitudinal axis 30 along at least one of the sides 38, 40, 42, 44. The peripheral surfaces 32, 34, 36 cooperate with the instrument panel 18 to increase the likelihood of movement of the knee bolster 12. For example, the peripheral surface 32 is ramped to slide along mating surface defined by the instrument panel 18 during upward movement of the knee bolster 12 in response to the force 26, best shown in FIGS. 3-5. Similarly, the peripheral surface 36 is ramped to slide along mating surface defined by the instrument panel 18 during horizontal movement of the knee bolster 12 in response to forces 28, 128, best shown in FIGS. 6-8. The peripheral surfaces 32, 34, 36 are ramped such that each is furthest from the longitudinal axis 30 adjacent to the impact areas 20, 120, 220. The knee bolster 12 defines a thickness 50 and the peripheral surfaces 32, 34, 36 extend over the thickness 50.

Figure 9:
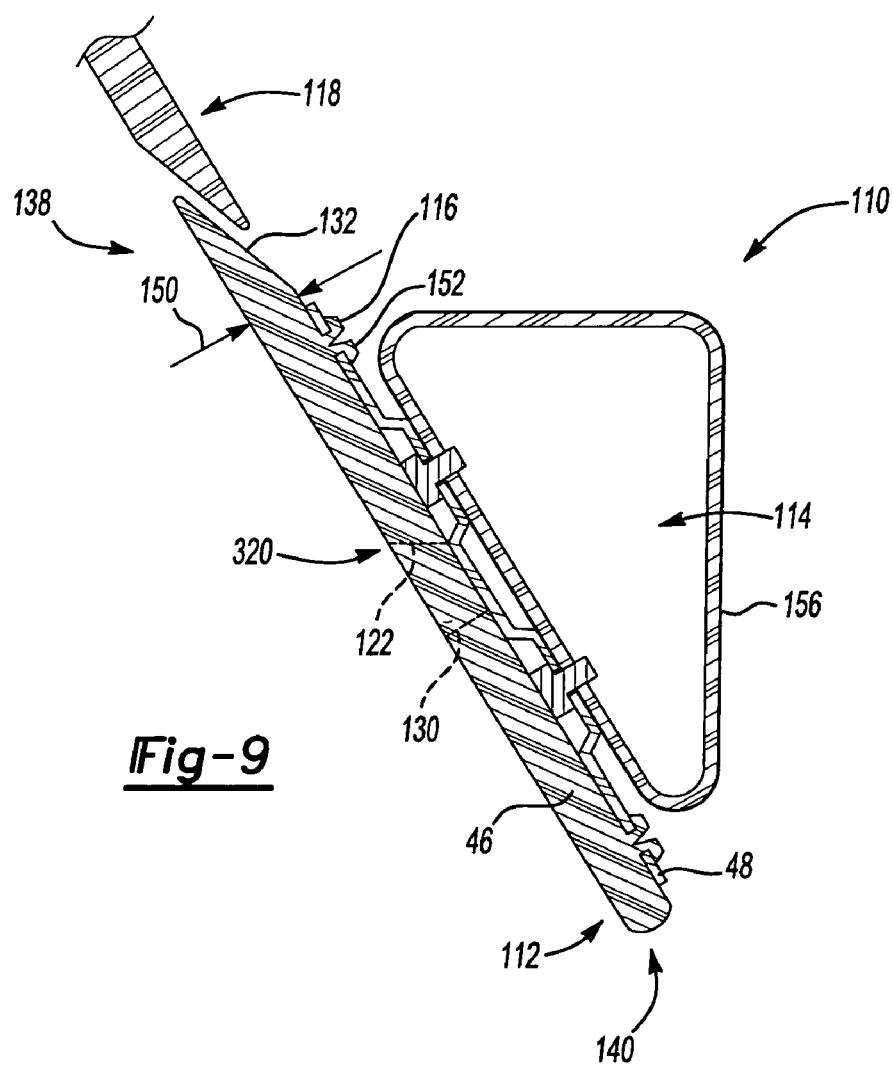
FIG. 9 is a first side view of a second exemplary embodiment of the invention.

In the first exemplary embodiment of the invention, the breakable portion 16 and the knee bolster 12 are integral. FIG. 9 illustrates an alternative embodiment of the knee bolster 112. In the second exemplary embodiment of the invention shown in FIG. 9, an apparatus 110 includes knee bolster 112 having a cover 46 and a base 48. The base 48 is fixedly associated with a mounting bracket 156. The cover 46 defines an impact area 320, a first striking axis 122, a longitudinal axis 130, a peripheral surface 132, a top side 138, a bottom side 140, and a thickness 150. The base 48 is fixedly associated with a mounting bracket 156. The apparatus 110 also includes a connecting device 114 having a breakable portion 116 operatively disposed between the cover 46 and the base 48. In response to forces acting transverse to the impact area 320, the cover 46 releases with respect to the base 48.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
   a knee bolster disposed in a vehicle for absorbing an impact from at least one knee of a driver; and
   a connecting device attached with said knee bolster and having a breakable portion for releasibly connecting said knee bolster to the vehicle such that said knee bolster breaks away from said breakable portion under predetermined conditions and slides relative to said breakable portion.

2. The apparatus of claim 1 wherein said knee bolster defines an impact area and said breakable portion extends substantially normal to said impact area and is constructed and arranged to shear transversely upon application of a shear force being at least one of said predetermined condition.

3. The apparatus of claim 1 wherein said knee bolster defines an impact area and a first striking axis aligned with said impact area.

4. The apparatus of claim 3 wherein said breakable portion is constructed and arranged to be breakable in response to forces acting on said impact area and transverse to said first striking axis.

5. The apparatus of claim 4 wherein said breakable portion is maintainable in response to forces acting on said impact area and aligned with said first striking axis.

6. The apparatus of claim 1 wherein said breakable portion and said knee bolster are integral.

7. The apparatus of claim 1 wherein said breakable portion includes at least one of a shearable member, a friction disc, and adhesive.

8. The apparatus of claim 1 wherein said knee bolster includes a cover and a base, wherein said breakable portion is operatively disposed between said cover and said base.

9. The apparatus of claim 1 wherein said knee bolster includes a longitudinal axis extending normal to an impact area and a peripheral surface extending transverse to said longitudinal axis and being furthest from said longitudinal axis adjacent to said impact area.

10. The apparatus of claim 9 wherein said knee bolster defines a thickness and said peripheral surface extends over said thickness.

11. The apparatus of claim 10 wherein said knee bolster includes a top side, a bottom side, a left side and a right side and said peripheral surface extends along at least one of said sides.

12. The apparatus of claim 11 wherein said peripheral surface only extends along said top side, said left side, and said right side.

13. An apparatus comprising:
    a knee bolster disposed in a vehicle for absorbing an impact from at least one knee of a driver;
    a connecting device associated with said knee bolster and having a breakable portion for releasibly connecting said knee bolster to the vehicle such that said knee bolster breaks away from said breakable portion under predetermined conditions and slides relative to at least part of said breakable portion;
    wherein said knee bolster includes a longitudinal axis extending normal to an impact area and a peripheral surface extending transverse to said longitudinal axis and being furthest from said longitudinal axis adjacent to said impact area;
    wherein said knee bolster defines a thickness and said peripheral surface extends over said thickness;
    wherein said knee bolster includes a top side, a bottom side, a left side and a right side and said peripheral surface extends along at least one of said sides; and
    wherein said peripheral surface only extends along less than all of said sides.

14. An apparatus comprising:
    a knee bolster disposed in a vehicle for absorbing an impact from at least one knee of a driver and defining a first striking axis and an impact area aligned with said first striking axis;
    a connecting device associated with said knee bolster and having a breakable portion defined as a snap fit connecting tab for releasibly connecting said knee bolster to the vehicle such that said knee bolster breaks away from the vehicle under predetermined conditions, said breakable portion disposed in spaced relation with respect to said impact area; and
    wherein said breakable portion is a unitary homogeneous part of said knee bolster prior to breaking away from said knee bolster.

15. The apparatus of claim 14 wherein said breakable portion is maintainable in response to impacting forces acting on said impact area and parallel with said first striking axis.

16. The apparatus of claim 15 wherein said breakable portion is breakable in response to impacting forces acting on said impact area and transverse to said first striking axis.

17. The apparatus of claim 16 wherein said breakable portion is shearable.

18. The apparatus of claim 17 wherein said breakable portion is plastic.

* * * * *